Oct. 29, 1935.                R. W. TRYON                2,018,769
                          BALL TYPE CHECK VALVE
                          Filed March 14, 1932
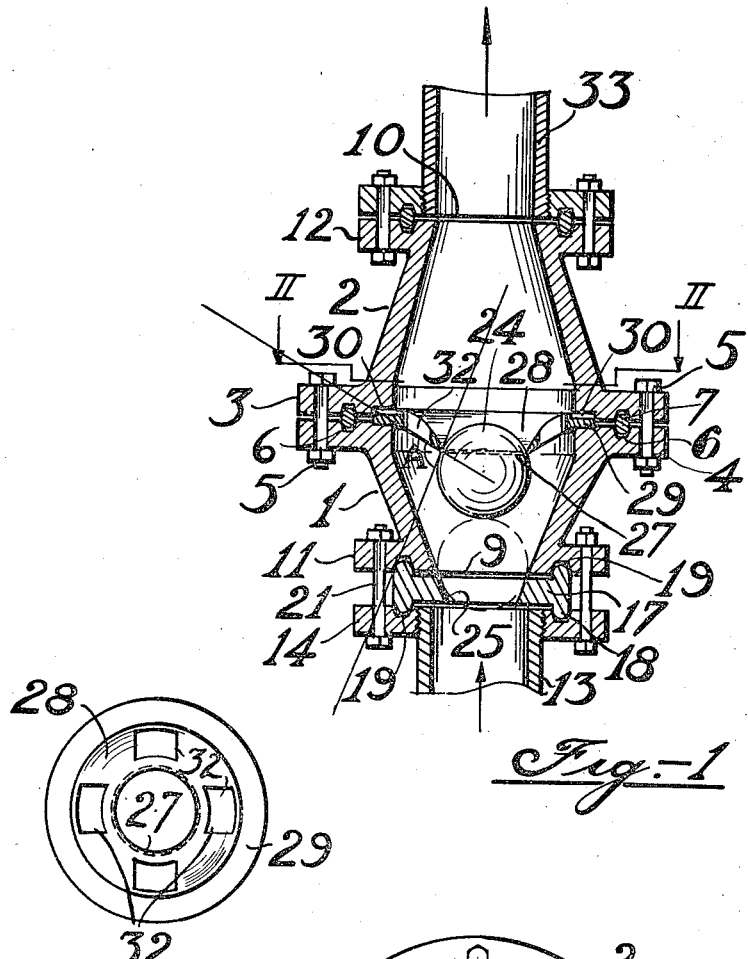
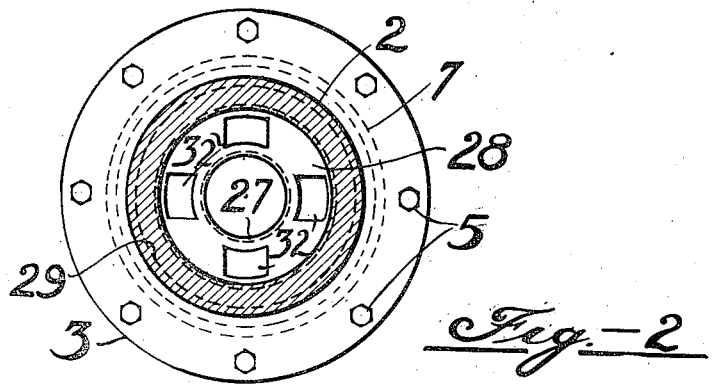
INVENTOR.
Richard W. Tryon
BY
W. E. Currie  ATTORNEYS.

Patented Oct. 29, 1935

2,018,769

UNITED STATES PATENT OFFICE 2,018,769

BALL TYPE CHECK VALVE

Richard W. Tryon, Elizabeth, N. J., assignor to Standard Oil Development Company, a corporation of Delaware Application March 14, 1932, Serial No. 598,609

1 Claims. (Cl. 251—121)

This invention relates to improvements in valve structure of the ball type.

The invention will be fully understood from the following description taken in connection with the accompanying drawing in which latter—

Fig. 1 is a longitudinal sectional view through a preferred form of valve structure, Fig. 2 is a transverse sectional view taken along the line 2—2 of Fig. 1, and Fig. 3 is the top plan view of the spider.

Referring particularly to the drawing, a housing is shown comprising sections 1 and 2 which are united at their flanged bases 3 and 4 by means of bolts 5. The flanged bases 3 and 4 are provided with adjoining grooves 6 which receive an annular ring 7 which seals the joint between the housing sections. In the preferred embodiment, the interior walls of the housing converge toward an inlet 9 and an outlet 10. Inlet 9 and outlet 10 are of lesser diameter than the interior of the housing, and are exteriorly flanged at 11 and 12 respectively.

Fluid is introduced into the housing by means of a pipe 13 having a flanged end 14 facing the inlet 9. A fluid tight seal is formed by means of a ring member 17 which has annular ribs 18 extending into recesses 19 in the flanged ends 11 and 14. Bolts 21 draw the ends together compressing the ring member forming a fluid tight seal.

The spherical ball 24 preferably formed of a suitable alloy steel is disposed within the valve housing. The ball cooperates with a seat 25 upon the ring member 17 to prevent back flow of fluid past the ring member. The seat 25 is of frusto-conical shape with its larger portion facing the interior of the housing. The ring member with its attached valve seat is readily removed from the housing by disconnecting the bolts 21. Valve seat 25 is the upstream seat for the ball 24.

A down stream seat 27 is provided for the ball upon flow of fluid down stream through the housing. The seat 27 is formed by a spider 28 which extends transversely across the housing and the base 29 of which is clamped between the sections 1 and 2 of the housing. A gasket 30 of soft material such as asbestos is disposed between the base 29 and a wall of the housing and functions to hold the spider in position rigidly. The upstream face of the spider is inclined upstream from its base to the seat 27. The down stream face of the spider converges toward the upstream face from its base and terminates in the seat 27. Preferably the spider is of a general frusto-conical shape. The seat 27 is machined concentric with the axis of the spider. The spider is provided with ports 32 which permit pressure drop across the spider during flow of fluid down stream through the housing. The ports are disposed in circular arrangement around the spider. The fluid such as mineral oil or the like enters the housing from inlet pipe 13 and flows through the housing with sufficient velocity to set the ball in motion with a result that the combined forces acting on the ball cause it to seat against seat 27 as shown in Fig. 1. These forces arise from the velocity effect on the upstream side of the ball and the pressure differential introduced across the ports 32 in the spider.

The valve structure is adapted for use in a flow stream for hot hydrocarbon oil subjected to a cracking operation. Similarly it is adapted for use in conjunction with high velocity vapors and a combination of fluids, as well as liquids. For such uses the ball seat 27 is machined to the radius of the ball and thereby minimizes coke deposition between the ball and the seat. The front of the ball remains free of coke due to the erosive action of the stream and sufficient turbulence exists behind the ball to prevent coke deposition at this area. The narrowness of the ball seat 27 and the relatively wide angles at which the sides of the spider approach the ball seat 27 minimize the possible area of coke deposits upon the valve seat and thereby prevent freezing of the ball to the valve seat 27 from coke deposits. By "wide angle" is meant that the angle of the upstream side of the spider with the tangent to the ball at the point of contact is at least a right angle or preferably, an obtuse angle. Referring to Fig. 1 of the drawing, the angle is designated as A. No obstructions or irregularities which might cause coke deposition exist between the extreme positions of the ball. Reversal of the flow causes the ball to seat against the upstream seat 25 as is shown in dotted lines in Fig. 1. The fluid is delivered from the housing through a flanged discharge line 33 which is secured to the flanged outlet 10 by a ring joint as shown.

By the construction described a ball type check valve is provided whereby detrimental chatter of the ball is wholly eliminated. The down stream seat for the ball cooperates with the ports in the spider to produce a sufficient pressure drop across the upstream and down stream sides of the ball when in position against the seat to prevent chattering of the ball. The ball is firmly held in seated position so long as there is appreciable flow in the normal direction. The check valve can be disposed with its axis horizontal or with its axis in a vertical position and the advantages of the invention will be retained. Alternatively the spider can be constructed as a flat plate with a central opening the upstream edge of which is beveled off to form a flat seat, and a plurality of ports symmetrically disposed around the central opening, and some of the advantages of the invention will be retained. A check valve so constructed is adapted for use in carrying cold oil at high velocity.

Various changes may be made within the scope of the appended claim in which it is desired to claim all novelty inherent in the invention as broadly as the prior art permits.

I claim:

A ball valve assembly comprising a housing flanged at both inlet and outlet ends, enlarged and flanged at the middle, the middle flanges compressing the rim of a slotted spider, said spider comprising a hollow frustum of a right circular cone converging upstream from its base and terminating in a seat, a ball for said seat, the upstream side of the frustum forming an obtuse angle with the tangent to the ball at a point of contact, said ball being in the upstream section of the housing, and a flanged plate gasket seat for the ball on the upstream end of said housing.

RICHARD W. TRYON.